Nov. 8, 1960 H. MAGNUSKI 2,959,673

RADIO RECEIVER SQUELCH CONTROL

Filed July 1, 1957

INVENTOR.
Henry Magnuski
BY Mueller & Aichele
Attys.

United States Patent Office 2,959,673
Patented Nov. 8, 1960

2,959,673

RADIO RECEIVER SQUELCH CONTROL

Henry Magnuski, Glenview, Ill., assignor to Motorola, Inc., Chicago, Ill., a corporation of Illinois Filed July 1, 1957, Ser. No. 669,251
10 Claims. (Cl. 250—20)

This invention relates generally to radio receivers and more particularly to squelch control systems as used in communication receivers.

It is common practice to incorporate a squelch circuit in communication receivers so that output signals are derived from the receiver only when desired signals are being received, while at other times, the receiver is inoperative to prevent noise from appearing at the receiver output. Such squelch circuits should be sensitive so that the system is open even on weak desired signals and should be stable to promote reliable operation despite noise level, voltage or temperature variations at the receiver. Furthermore, the more effective squelch systems are positive acting and relatively insensitive to a shift of the carrier frequency of a desired signal. It is also highly advantageous that the squelch system will not reclose (to silence the receiver) on audio, or modulation of the carrier, due to modulation peaks or harmonics.

In the present state of the communication art, emphasis is being placed on more effective use of the radio frequency energy spectrum and consequently, narrow band or split channel operation is often used. While the above attributes for squelch circuits are difficult to obtain with presently known squelch systems and usual receiver bandwidths, they are even more difficult to realize in narrow band receivers. For example, squelch sensitivity to weak signals may be reduced, or the ability to operate properly with a shift of carrier frequency may be impaired.

Also transistors are frequently used now to replace tubes. It is known that the gain of transistor stages varies considerably with ambient temperature and supply voltage. This makes it more difficult to balance prior squelch circuits so that they will act properly and independently of temperature and voltage variation. As a further problem with prior squelch circuits, particularly in narrow band communication systems, it may be found that audio clamping occurs, that is, that the squelch recloses on modulation peaks or harmonics.

Accordingly, it is an object of the present invention to overcome such difficulties and provide an effective squelch circuit particularly useful in a narrow bandwidth radio receiver.

Another object is to provide a highly sensitive squelch circuit for a communication receiver.

A still further object is to provide a squelch system for a communication receiver which system is very stable and relatively insensitive to power supply voltage changes, temperature changes, or noise level changes at the receiver input.

Another object of the invention is to provide a squelch circuit which tolerates changes of the carrier frequency of desired signals without undue adverse effects on the operation of such circuit.

A still further object is to provide a radio receiver with an improved squelch control therefor wherein modulation of a desired signal tends to open the squelch in a manner to do away with audio clamping exhibited in the prior art by reclosing of the squelch on modulation peaks.

A feature of the invention is the provision of an improved squelch circuit for a communication receiver which squelch circuit opens in the presence of a carrier on the difference in level of noise components in a band within the modulation range over the level of noise energy in a frequency band below that of the modulation range.

Another feature is the provision of a squelch circuit for silencing an angular modulation communication receiver in the absence of a modulated carrier by comparison of low frequency noise energy below the communication audio frequency band in the region of approximately 70–200 cycles per second, with the noise and modulation in the frequency region above 200 cycles per second.

A further feature of the invention is the provision of an improved squelch circuit for a communication receiver which utilizes a common amplifier for noise components in a first or audio modulation range and noise components in a second frequency range below the first range to promote stability by common translation of the signals which are compared in strength for opening or closing the receiver output channel.

Further objects, features and the attending advantages of the invention will be apparent by consideration of the following description when taken in conjunction with the accompanying drawings in which.

Figures 1, 2, 3, 4:
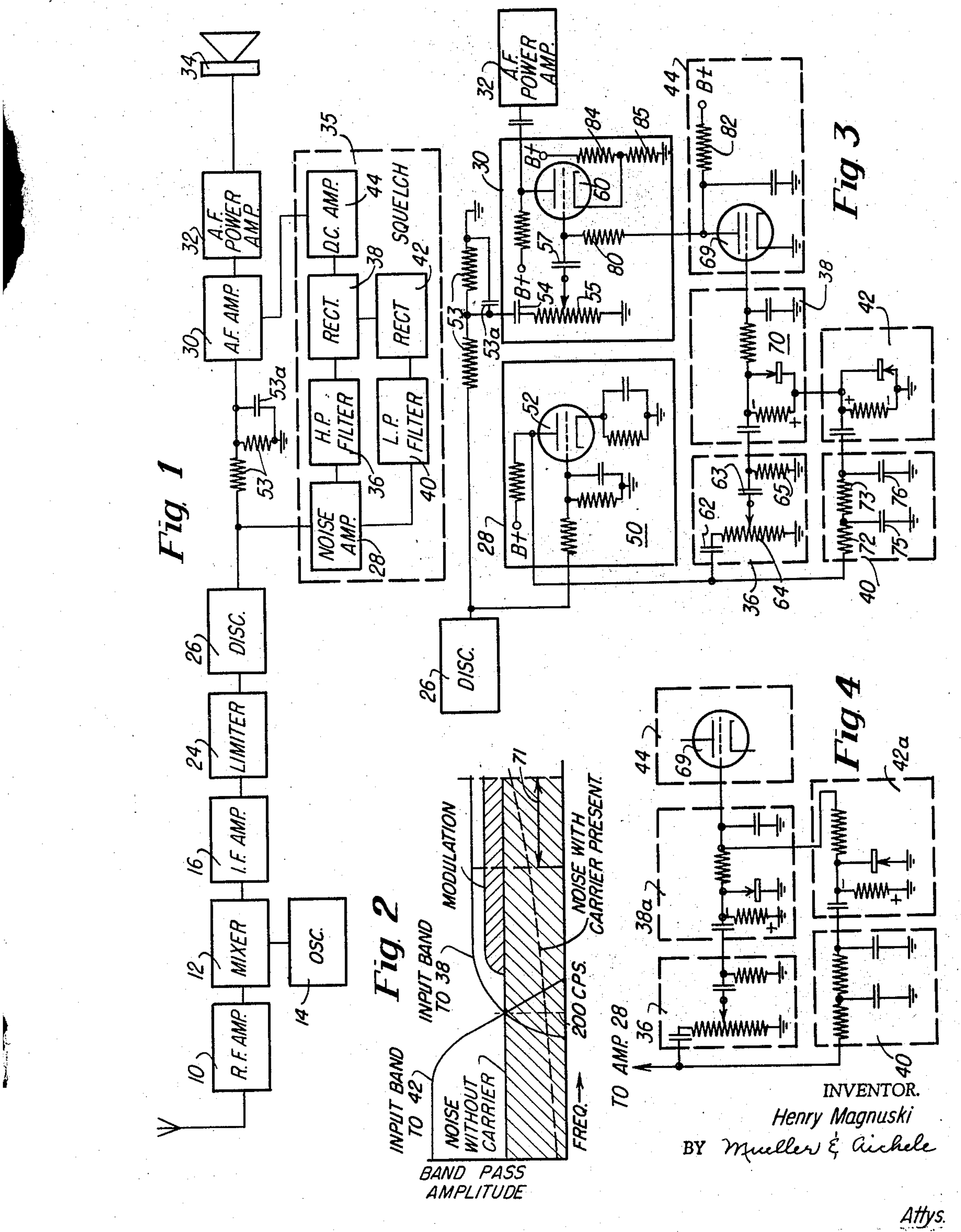
Fig. 1 is a block diagram of a communication receiver incorporating the present invention.
Fig. 2 is a diagram useful in explaining the operation of the invention.
Fig. 3 is a schematic diagram of a portion of the circuit of Fig. 1.
Fig. 4 is a schematic diagram of a modification of the circuit of Fig. 3.

In practicing the invention there is provided a squelch circuit for a communication receiver which operates by comparison of the detected noise components in a frequency range including communication voice signals, with the noise components in a frequency band below that of the modulation range. By differentially combining control voltages established by such noise components in the presence of a desired carrier the squelch circuit may be opened when high frequency noise predominates sufficiently or closed when the low frequency noise predominates sufficiently. Such a system exhibits a high degree of sensitivity and is particularly adapted to be used in a narrow band angular modulation system since in a frequency detector low frequency noises quiets faster, or changes in relative amplitude in the presence of a carrier by a greater extent, than does noise in a higher range. In the preferred form of the invention, the noise in both bands is derived from a common noise amplifier of the receiver by means of low and high pass filters. The use of a common amplifier for these signals results in improved stability and immunity to power voltage changes and the like.

Fig. 1 shows in block form an angular modulation communication receiver including a radio frequency amplifier 10 connected to a mixer 12 in which a received signal is heterodyned with a signal from local oscillator 14. The heterodyned signal is then applied to intermediate frequency amplifier 16 from which it is coupled to the limiter circuit 24 and from there to the discriminator or detector 26. Demodulated signals are then successively applied through amplifiers 30 and power amplifier 32 to the loudspeaker 34.

Discriminator 26 is connected to the squelch circuit 35 and more particularly to a noise amplifier 28. The output of this amplifier feeds a high pass filter circuit 36 which is designed to pass the noise components and demodulated signals of the order of 200 cycles per second and higher and from there the signals are applied to a rectifier 38 which produces a control voltage of a given polarity. The output signals from amplifier 28 are also applied to a low pass filter 40 which is designed to pass signals between approximately 70–200 cycles per second. In a communication system of the type being described, the modulation intelligence is generally in a frequency range above 200 cycles per second so that the output of low pass filter 40 will be noise signals. These noise signals are applied to a rectifier 42 which rectifies them to produce a control potential of a polarity opposite to that produced by rectifier 38. The two control potentials are differentially combined and applied to a direct current amplifier 44, the output of which is used to control (open or close) audio frequency amplifier 30.

Accordingly, when the desired carrier is received and the higher frequency noise components produce a control potential which exceeds that produced by the lower frequency noise components, the direct current amplifier 44 applies a control signal to amplifier 30 thereby opening the squelch. When the desired signal ceases, the squelch will be closed since the control potential produced by the noise passed by the filter 36 will not predominate.

Fig. 2 shows noise level in the receiver with a carrier present in the frequency ranges of signals used in the squelch circuit of the present invention. It may be noted that the noise signals exist in the ranges passed by both filters 36 and 40, and the demodulated signals exist in a frequency band above 200 cycles per second and are thus passed only by filter 36.

As previously pointed out, operation in the manner described is highly effective when used with a receiver having a narrow or limited bandwith, e.g., a receiver bandwidth of 12 kc. with a carrier deviation of the order of 5 kc. By using low frequency noise components advantage is taken of the fact that these noise components are subject to a large FM improvement, that is, a relatively great decrease in value when a carrier signal is translated by the receiver. This permits the squelch to be very sensitive and to open when a weak carrier wave is received. Furthermore, since low frequency noise is used for comparison in the squelch circuit, a deviation of the received carrier from its center frequency can be tolerated without adverse effects on the squelch circuit operation. Furthermore, it may be noted that even though there are modulation peaks of the carrier wave, any modulation tends to open the squelch and therefore there will not be a tendency for the squelch circuit to reclose during such modulation peaks. In this regard the system may be contrasted to one utilizing noise signals in a range higher than that of the modulated intelligence in which case the problem of audio clamping can exist.

Referring now to Fig. 3, it may be seen that the noise amplifier 28 includes a filter network 50 which is connected between discriminator 26 and the input of vacuum tube 52. The output discriminator 26 is also coupled by way of voltage divider 53, blocking capacitor 54, a portion of volume control 55, and through blocking capacitor 57 to the grid of vacuum tube 60 in the amplifier stage 30. The output of stage 30 is applied to the audio frequency power amplifier 32 in a conventional manner. Resistors 53 and capacitor **53*a*** provide deemphasis in an FM system or conversion in a PM system.

The output signals from tube 52 are connected to high pass filter 36 which includes series capacitors 62 and 63 and shunt resistors 64 and 65, resistor 64 being tapped in order to provide a squelch control adjustment for setting the signal level at which the squelch will open. Filter 36 is connected to the rectifier circuit 38 which is poled to produce a negative control potential which is applied to the grid of vacuum tube 69 in direct current amplifier 44. RC filter 70 controls the speed of response of the squelch system.

The output of vacuum tube 52 is also connected to low pass filter 40 which includes series connected resistors 72 and 73 and shunt capacitors 75 and 76. Filter 40 is coupled to the rectifier circuit 42 which is poled to produce a positive potential with respect to ground and this rectifier is connected in series with rectifier 38, with the two rectifiers then being coupled between the grid and cathode of tube 69. It should be noted that the bandwidth passed by filter 36 is wider than that passed by filter 40 so the amplitude of the energy applied to rectifier 38 is made less than that applied to rectifier 42 (Fig. 2) so that the outputs may be properly compared differentially. It may also be desirable to construct filter 36 as a band pass filter so as to pass a band defined by range 71 in Fig. 2, so that the noise components may be differentially compared for outputs of different polarities in the presence and absence of a carrier.

The anode of tube 69 is connected through resistor 80 to the grid of tube 60 and also through resistor 82 to B-plus. A cathode of tube 60 is connected to the junction of resistors 84 and 85 which are connected in series between B-plus and ground. The values of resistors 80, 82, 84 and 85 are selected so that a given amount of reduction in the conduction of tube 69 will alter the bias between grid and cathode of tube 60 so that it will conduct and pass audio signals from the amplifier 28 to the amplifier 32. Accordingly, when the output of rectifier 38, which is a negative control potential applied to the grid of tube 69, reaches a sufficient value with respect to the control potential from rectifier 42, conduction of tube 69 will be reduced sufficiently to allow conduction of tube 60. However, when a signal is no longer translated by the receiver, the low frequency noise producing the compositive control potential of rectifier 42 will cause a net bias of tube 69 resulting in increased conduction thereof and decrease of the potential on the grid of tube 60 so that this tube is cut off and signals are not translated by amplifier 30, thereby silencing the output of the receiver so that noise signals will not be heard from loudspeaker 34. Voltage divider 53 and control 55 drives tube 60 with audio signals at a level sufficiently low that the signals are blocked when the squelch is closed.

Fig. 4 is a modification of the circuit of Fig. 3 wherein output signals from tube 52 are applied to high pass filter 36 and low pass filter 40 which have been described previously. Rectifiers **38*a* and 42*a*, however, are, in this form of the invention, coupled in parallel and to the grid of tube 69. The polarity is such that desired modulation and higher frequency noise produces a negative control potential in rectifier 38*a* and low frequency noise produces a positive control potential in rectifier 42*a*. The signals are differentially combined by interconnecting the outputs of these rectifiers in parallel, with the net potential being applied between the grid and cathode of tube 69**. The operation of the circuit of Fig. 4 is then entirely comparable to that of the circuit of Fig. 3.

The squelch system of the present invention may exhibit a high degree of stability since a common amplifier is used to translate both noise bands in which components are compared to cause operation of the squelch circuit. Thus, if there should be any variation in the voltage from the power supply or a variation in temperature or in the noise level, such change will cause a proportionate change in amplification of each signal and the next change in operation of the squelch system would be substantially unaffected. The squelch system is sensitive even to weak carriers because the low frequency noise is subject to a large FM improvement (compared to the higher frequency noise) and the circuit is not subject to clamping or reclosing on audio signals, but rather these signals tend to keep the squelch open. Furthermore, shifts in carrier frequency have minimal effect on the circuit of the invention since the ratio of noise components remains substantially constant under such conditions and it is that which causes operation of the system.

This invention provides therefore an improved squelch control particularly adapted for narrow band communication systems. The circuit maintains high sensitivity and positive action without adverse effects of instability of power supply voltage or shift in the carrier of a signal.

I claim:

1. In a radio receiver having signal receiving means, discriminator means and a signal translating channel for demodulated signals, the control system for rendering the signal translating channel operative on reception of a desired signal and inoperative in the absence of such a signal including in combination, first circuit means including a filter responsive to noise components appearing in said discriminator means within a certain frequency range to produce a first control potential of given polarity, second circuit means including a filter responsive to noise components appearing in said discriminator means and having frequencies below said certain frequency range to produce a second control potential of opposite polarity, and means coupled to said first and second circuit means for differentially combining said first and second control potentials and rendering the signal translating channel operative in response to a given decrease of said second control potential with respect to said first control potential due to low frequency quieting by the discriminator means.

2. In a radio receiver having signal receiving means, discriminator means for received signals and an audio frequency signal translating channel for demodulated signals, the control system for rendering the signal translating channel operative on reception of a desired signal and inoperative in the absence of such a signal including in combination, first circuit means coupled to said discriminator means and responsive to pass only noise components above a certain frequency and in the frequency range of the demodulated audio frequency signals to produce a first control potential of given polarity, second circuit means coupled to said discriminator means and reponsive to pass only noise signals appearing in the demodulating means and having frequencies below said certain frequency to produce a second control potential of opposite polarity, and means coupled to said first and second circuit means for differentially combining said first and second control potentials and rendering the audio frequency signal translating channel operative only in response to a given predominance of said first control potential as compared to said second control potential due to low frequency quieting by the discriminator means.

3. In an angular modulation radio receiver having signal receiving means, demodulating means for received angular modulation signals and a signal translating channel including amplifying means for demodulated signals, the squelch control system for rendering the signal translating channel operative on reception of a desired signal and inoperative in the absence of such a signal, including in combination first circuit means coupled to the amplifying means and responsive to demodulated components above a certain frequency to produce a first control potential of given polarity, second circuit means coupled to the amplifying means and responsive to noise components having frequencies below said certain frequency to produce a second control potential of opposite polarity, and circuit means coupled to said first and second circuit means for differentially combining said first and second control potentials and rendering the signal translating channel operative in response to given predominance of said first control potential and inoperative in response to absence of the given predominance of said first control potential.

4. In a radio receiver having signal receiving means for angular modulation signals, the modulating means for the angular modulation signals and an audio frequency signal translating channel subject to operation by application of a control potential of given polarity thereto, the squelch control system for rendering the signal translating channel operative on reception of a desired signal and inoperative in the absence of such a signal, including in combination, first circuit means having a filter responsive to pass only demodulated signal components above a certain frequency and a rectifier for the demodulated signal components to produce a first control voltage of the given polarity, second circuit means having a filter responsive to pass only noise signals having frequencies below the certain frequency and a rectifier for the noise signals to produce a second control voltage of opposite polarity, and means coupled to said first and second circuit means for differentially combining said first and second control voltages and for applying the difference potential thereof to the audio frequency signal translating channel as a control potential therefor.

5. In an angular modulation radio receiver having signal receiving means, demodulating means for received angular modulation signals and an audio frequency signal translating channel subject to operation by application of a control potential of given polarity thereto, the squelch control system for rendering the signal translating channel operative on reception of a desired signal and inoperative in the absence of such a signal, including in combination first circuit means having a filter responsive to pass only demodulated signal components in a range above 200 cycles per second and a rectifier for the demodulated signal components to produce a first control voltage of the given polarity, second circuit means having a filter responsive to pass only noise signals having frequencies below 200 cycles per second and a rectifier for the noise signals to produce a second control voltage of opposite polarity, and means coupled to said first and second circuit means for differentially combining said first and second control voltages and for applying the difference potential thereof to the audio frequency signal translating channel as a control potential therefor.

6. A narrow band frequency modulation radio receiver with a squelch control system, including in combination signal receiving means, demodulating means for received frequency modulation signals, an audio frequency signal translating channel, said signal translating channel including amplifying means having an input circuit coupled to said demodulating means and further having an output circuit, said signal translating channel further having an output portion subject to operation by application of a control potential of given polarity thereto, first circuit means coupled to said output circuit and having a filter responsive to demodulated signal components above a certain frequency and a rectifier for the demodulated signal components to produce a first control voltage of the given polarity, second circuit means coupled to said output circuit and having a filter responsive to noise signals having frequencies below the certain frequency and a rectifier for the noise signals to produce a second control voltage of opposite polarity, and means coupled to said first and second circuit means for differentially combining said first and second control voltages and for applying the difference potential thereof to said output portion of said audio frequency singal translating channel as a control potential therefor.

7. An angular modulation communication receiver with a squelch control system, including in combination radio frequency signal receiving and translating means, demodulating means for received angular modulation signals and accompanying noise components, an audio frequency signal translating channel, said signal translating channel having a circuit portion subject to operation by application of a control potential of given polarity thereto, amplifying means having an input circuit coupled to said demodulating means and further having an output circuit at which appears demodulated audio signals and noise components, first circuit means coupled to said output circuit and having a filter adapted to pass demodulated signals in a range above 200 cycles per second and a rectifier for the demodulated signals to produce a first control voltage of the given polarity, second circuit means coupled to said output circuit and having a filter adapted to pass noise components having frequencies below 200 cycles per second and a rectifier for the noise components to produce a second control voltage of opposite polarity, and means coupled to said first and second circuit means for differentially combining said first and second control voltages and for applying the difference potential thereof to said circuit portion of said audio frequency signal translating channel as a control potential therefor.

8. In a radio receiver having signal receiving means for angular modulation signals, demodulating means for received angular modulation signals and an audio frequency signal translating channel subject to operation by application of a control potential of given polarity thereto, the squelch control system for rendering the signal translating channel operative on reception of a desired signal and inoperative in the absence of such a signal and in the presence of noise components, including in combination, first circuit means having a filter responsive to demodulated audio frequency signals and noise components above a certain frequency and a rectifier for the demodulated signals and components to produce a first control voltage of the given polarity, second circuit means having a filter responsive to noise components having frequencies below the certain frequency and a rectifier for such noise components to produce a second control voltage of opposite polarity, a direct current amplifier connected to the signal translating channel, and means coupled to said direct current amplifier and to said first and second circuit means for applying said first and second control voltages in series to control said direct current amplifier for regulating the signal translating channel according to the predominance of said first control voltage.

9. In a radio receiver having signal receiving means for angular modulation signals, demodulating means for receiving angular modulation signals and an audio frequency signal translating channel subject to operation by application of a control potential of given polarity thereto, the squelch control system for rendering the signal translating channel operative on reception of a desired signal and inoperative in the absence of such a signal and in the presence of noise components, including in combination, first circuit means having a filter responsive to demodulated audio frequency signals and noise components above a certain frequency and a rectifier for the demodulated signals and components to produce a first control voltage of the given polarity, second circuit means having a filter responsive to noise components having frequencies below the certain frequency and a rectifier for such noise components to produce a second control voltage of opposite polarity, a direct current amplifier connected to the signal translating channel, and means coupled to said direct current amplifier and to said first and second circuit means for applying said first and second control voltages in parallel to control said direct current amplifier for regulating the signal translating channel according to the predominance of said first control voltage.

10. In a frequency modulation radio receiver having signal receiving means, discriminator means for demodulating received signals and a signal translating channel for demodulated signals, the squelch control system for rendering the signal translating channel operative on reception of a desired signal and inoperative in the absence of such a signal, including in combination an amplifier coupled to the signal translating channel, a first filter coupled to said amplifier and having a high frequency pass band to translate a portion of the demodulated signals including noise components, first circuit means coupled to said first filter to produce a first control potential of given polarity, a second filter coupled to said amplifier and having a low frequency pass band to translate further noise components, second circuit means coupled to said second filter to produce a second control potential of opposite polarity, and further circuit means coupled to said first and second circuit means for differentially combining said first and second control potentials and rendering the signal translating channel operative in response to a given predominance of said first control potential with respect to said second control potential.

References Cited in the file of this patent

UNITED STATES PATENTS

| | | |
|---|---|---|
| 2,420,518 | Brown | May 13, 1947 |
| 2,516,937 | Young | Aug. 1, 1950 |
| 2,694,142 | Laidig | Nov. 9, 1954 |
| 2,802,939 | Klehfoth | Aug. 13, 1957 |